US012098955B2

(12) United States Patent
Bischoff

(10) Patent No.: US 12,098,955 B2
(45) Date of Patent: Sep. 24, 2024

(54) METHOD AND DEVICE FOR DETECTING AND ADJUSTING DECORATIVE COLOUR FORMULATIONS IN ALIGNMENT WITH THE VISUAL PERCEPTION OF TEXTURE CHARACTERISTICS

(71) Applicant: BASF Coatings GmbH, Münster (DE)

(72) Inventor: Guido Bischoff, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 423 days.

(21) Appl. No.: 17/426,212

(22) PCT Filed: Jan. 30, 2020

(86) PCT No.: PCT/EP2020/052370
§ 371 (c)(1),
(2) Date: Jul. 28, 2021

(87) PCT Pub. No.: WO2020/157244
PCT Pub. Date: Aug. 6, 2020

(65) Prior Publication Data
US 2022/0107222 A1     Apr. 7, 2022

(30) Foreign Application Priority Data

Jan. 31, 2019 (EP) ..................................... 19154898

(51) Int. Cl.
*G06K 9/00* (2022.01)
*G01J 3/46* (2006.01)
(Continued)

(52) U.S. Cl.
CPC .............. *G01J 3/463* (2013.01); *G01J 3/504* (2013.01); *G06T 7/40* (2013.01); *G06T 7/62* (2017.01);
(Continued)

(58) Field of Classification Search
CPC .. G01J 3/463; G01J 3/504; G06T 7/40; G06T 7/62; G06T 7/90; G06T 2207/10024;
(Continued)

(56) References Cited

U.S. PATENT DOCUMENTS

2004/0252308 A1    12/2004  Prakash et al.
2009/0019086 A1     1/2009  Prakash et al.
(Continued)

OTHER PUBLICATIONS

International Search Report for corresponding PCT/EP2020/052370 mailed Jun. 8, 2020, 2 Pages.

*Primary Examiner* — Atiba O Fitzpatrick
(74) *Attorney, Agent, or Firm* — Armstrong Teasdale LLP

(57) ABSTRACT

Described herein is a computer-implemented process which includes at least the following steps:
  receiving at least one image or a plurality of images,
  implementing an image analysis for each of the images obtained, using at least one processor,
  identifying at least one sparkle point within a respective image,
  implementing a features analysis of the at least one identified sparkle point in the respective image in respect of at least one predefined size feature,
  determining at least one value for the at least one predefined size feature for the at least one sparkle point,
  calculating a size distribution for the respective image based on the determined value for the at least one predefined size feature, and
  providing a formulation for a coating which is identical or at least similar in appearance to the target coating.

12 Claims, 6 Drawing Sheets

(51) Int. Cl.
   *G01J 3/50* (2006.01)
   *G06T 7/40* (2017.01)
   *G06T 7/62* (2017.01)
   *G06T 7/90* (2017.01)
(52) U.S. Cl.
   CPC ...... *G06T 7/90* (2017.01); *G06T 2207/10024* (2013.01); *G06T 2207/30156* (2013.01)
(58) Field of Classification Search
   CPC . G06T 2207/30156; G06T 2207/10016; G06T 2207/20056; G06T 2207/20076; G06T 2207/20084; G06T 7/41; G06T 2207/20092; G06T 7/0004; G01N 2021/4711; G01N 21/4738; G01N 21/25–61; G06F 16/5838; G06V 10/54; G06V 10/56; H04N 1/6038
   See application file for complete search history.

(56) References Cited

U.S. PATENT DOCUMENTS

| | | | |
|---|---|---|---|
| 2010/0027870 A1* | 2/2010 | Rodrigues | G06T 7/0004 382/141 |
| 2016/0117844 A1* | 4/2016 | Beymore | G06T 7/90 382/162 |
| 2018/0144505 A1* | 5/2018 | Beymore | G01J 3/50 |

\* cited by examiner

METHOD AND DEVICE FOR DETECTING AND ADJUSTING DECORATIVE COLOUR FORMULATIONS IN ALIGNMENT WITH THE VISUAL PERCEPTION OF TEXTURE CHARACTERISTICS

CROSS-REFERENCE TO RELATED APPLICATIONS

This application is a U.S. National Phase Application of International Patent Application No. PCT/EP2020/052370, filed Jan. 30, 2020, which claims priority to European Patent Application No. 19154898.1, filed Jan. 31, 2019, the entire contents of which are hereby incorporated by reference herein.

FIELD OF INVENTION

The presented invention relates to a process and an apparatus for finding and adapting effect color formulations, incorporating comparison with the visual perception of texture qualities.

BACKGROUND

Owing to the nature of complex mixtures in coatings, especially paint coatings, it is sometimes difficult to formulate, identify, and search a databank for acceptable, matching formulations and/or pigmentations, especially effect color formulations, for coatings of these kinds.

In an ideal scenario, a person would be able to investigate this kind of complex mixture of a target coating, determine/identify the suitable pigments within the mixture, and reproduce the mixture correspondingly. In practice, however, the pigments identified in a mixture of a target coating are not always readily available in a set of toners of a color system which is to be used for producing a second coating substantially coinciding with/matching the target coating. Generally, therefore, it is necessary for an experienced colorist to ascertain whether the color system available and intended for use for producing the second coating comprises suitable pigments and/or pigments and/or toners similar to the pigments identified in the target coating, and, if this is the case, this colorist has to stipulate, additionally, amendments which must be performed in order to adapt the differences or the toners to the target coating, since the pigments/toners generally do not coincide exactly with the original pigmentation of the target coating.

A possible solution for determining the composition/formulation of an unknown coating or pigmentation, i.e., of the target coating, is to investigate the unknown coating or target coating with an instrument/system and, on the basis of the results obtained in the investigation, to scan a databank for a best-fit coating formula or formulation. Such a solution, however, is only hypothetical, since, while known systems are indeed able to identify the optimally matching hue from a databank, they generally cannot be useful in determining, for example, a specific selection of aluminum pigments and pearlescent pigments ("pearl") required for adaptation to a target coating, with sufficient accuracy.

At present, in an operation for finding a color formulation for a target color, texture qualities are used/considered as additional conditions alongside color information, examples of such texture qualities being coarseness, gloss or sparkle area, gloss or sparkle intensity, gloss or sparkle grade, or gloss or sparkle color variation.

As an additional tool for identifying the best-possible combination of specific effect pigments, it is possible to use a microscope, with which pigment size distributions and forms of specific effect pigments can also be estimated adequately, this being a time-consuming operation which does not satisfactorily address those applications aimed at modifying characteristics of a sample and an effect of specific pigments within the context of producing a second coating attuned or to be attuned with a target coating.

Moreover, the mere use of known/existing texture features or texture qualities of known toners/pigments in a color comparison and adaptation procedure often leads, owing to a lack of coincidence with an ultimately perceptible texture appearance, to a poor approximation/convergence and to a large number of necessary alignment steps.

It was an object of the present invention to provide a process and an apparatus suitable for analysis of complex mixtures of coatings, particularly of paints, having gloss color/sparkle color, and for providing a second coating substantially coincident with a target coating selected from the coatings with complex mixtures.

DESCRIPTION

To achieve the object, the present invention provides a process and an apparatus having the features of the independent claims. Embodiments of the process or of the apparatus are evident from the corresponding respective dependent claims and from the description.

In order to be able to carry out satisfactorily a color comparison and matching procedure between a target coating and a second coating to be adapted to the target coating, texture features of the respective coatings ought to be used/considered, these features having specific qualities:

The texture features of a (coating) sample under consideration/investigation are to correlate with a visual perception.

The texture features of a (coating) sample under consideration/investigation are to correlate with the concentration of respective effect pigments in the (coating) sample under consideration/investigation.

The texture features of a (coating) sample under consideration/investigation are to encompass comprehensible information concerning the pigmentation, particularly in the case of mixtures of different effect pigments.

The behavior of the texture features of a (coating) sample under consideration/investigation is to be describable by means of a continuous function, particularly in the case of mixtures of different effect pigments in a coating or a paint.

The present invention describes a determination, more particularly calculation, of texture features which have the qualities described above. The texture features for calculation in accordance with the invention are calculated on the basis of calibrated HDR ("High Dynamic Range") images (in the RGB color space) and can be integrated as a secondary condition or additional condition into existing/known color adaptation processes/algorithms.

A computer-implemented process is provided which has at least the following steps:

obtaining at least one image or a plurality of images, the at least one image having been recorded at a determined measuring geometry, or each image of the plurality of images having been recorded under a different measuring geometry, i.e., under a different angle of illumination and/or a different angle of measurement/ consideration, in relation to a surface of a target coating, using an image capture unit, implementing an image analysis for each of the images obtained, using at least one processor designed/configured so as to execute at least one filter technique, identifying at least one sparkle/gloss point within a respective image, implementing, using the at least one processor, a features analysis of the at least one identified sparkle point in the respective image in respect of at least one predefined size feature, determining a measure or a value for the at least one predefined size feature for the at least one identified sparkle point, calculating a size distribution for the respective image using the processor, based on the determined measure/the determined value for the at least one predefined size feature, providing a formulation for a coating which is identical or at least similar in appearance to the target coating, taking account of the calculated size distribution, using the processor.

It is conceivable for the recording of the at least one image or of the plurality of images likewise to be part of the process of the invention.

It is further conceivable for the provision of the formulation for the coating also to comprise an outputting of the formulation, such as, for example, a display of the formulation on a display unit, such as a display screen, and/or an acoustic outputting, by means of a loudspeaker, for example.

In a possible embodiment of the process of the invention, the at least one predefined size feature is selected from the group consisting of the following: area of the surface of the at least one sparkle point or of a respective sparkle point, diameter of the at least one sparkle point or of a respective sparkle point, perimeter of the at least one sparkle point or of a respective sparkle point.

Generally here the measure to be determined or the value to be determined is to be stated in a number of pixels, in a length unit and/or in an area unit, more particularly in micrometers and/or square micrometers.

In yet another embodiment of the process of the invention, a correlation is derived for at least one toner with the at least one defined measure for the at least one predefined size feature of the at least one sparkle point, the correlation indicating a contribution of the at least one toner to the size distribution of the at least one sparkle point, more particularly of two or more identified sparkle points in the at least one image or in the respective image.

In yet a further embodiment of the process of the invention, the derived correlation is used, with a measuring geometry or with two or more measuring geometries under which the at least one image or under which the plurality of images have been recorded, in order to adapt the at least one toner—when providing the formulation for the coating which is identical or at least similar in appearance to the target coating—to the size distribution of the at least one sparkle point in the at least one image or in the respective plurality of images, in other words in order to adapt a quantity for the at least one toner, to be specified when providing the formulation, i.e., the coating formulation, to the calculated size distribution of the at least one sparkle point.

The at least one toner and/or concentration thereof therefore constitutes a further, additional optimization parameter alongside, for example, the sparkle difference dS, color difference dE and coarseness difference dG.

In yet another embodiment of the process of the invention, in the at least one image, a count is made in each case of all sparkle points which have a same measure or a same value for the at least one size feature. It is conceivable thereby for a histogram and/or a statistic to be compiled in each case for the at least one image with the respective number of sparkle points having the respectively same measure or same value of the at least one size feature. From this it is then possible, for example, to determine an average measure or an average value for the at least one size feature, such as, for example, diameter, radius, perimeter, area, number of pixels. Furthermore, the average value or mean can be used to determine a standard deviation of the values of the at least one size feature for all the sparkle points within the at least one image or the respective image. The standard deviation constitutes a measure of the scattering of the individual values of the at least one size feature for the respective sparkle points from the mean. The standard deviation can be described, for example, in the form of the average square of deviation.

As an alternative or supplement to the average value for the at least one size feature, furthermore, it is possible to determine the median of the values of the at least one size feature in each case of all the sparkle points in the at least one image or respective image. Furthermore, the quartiles of the values of the at least one size feature in each case of all sparkle points in the respective image can be determined.

To provide the formulation for the coating which is identical or at least similar to the target coating, in one embodiment a basic coating is first provided which is adapted to the target coating by successive addition and/or variation of identified toners, taking account of the calculated size distribution and of other parameters, such as, for example, color difference dE, coarseness difference dG, sparkle difference dS, etc. This means that as part of a formula algorithm for finding the formulation for the coating at least similar to the target coating, not only the parameters known from the prior art, such as color difference dE, coarseness difference dG and/or sparkle difference dS, but also the size distributions calculated in accordance with the invention, and the new texture parameters which can be derived from them and which have in some cases been stated above, are taken into account. In the context of a color formula, attempts are made to adapt to one another the texture parameters of which some were stated above by way of example, particularly the above-stated new texture parameters of measuring geometries, to be fitted to one another, between target coating and hue reproduction, i.e., the coating which in terms of appearance is identical or at least similar to the target coating.

In yet another embodiment of the process of the invention, the provision of the coating formulation comprises generating a list of toners. In this case it is also possible for the concentrations of the respective toners to be used in each case, or mixing ratios of the toners to be used, to be specified as well.

In a supplementary or alternative embodiment of the process of the invention, the provision of the coating formulation comprises the comparing of the size distribution with a respective size distribution of a multiplicity of known coating formulations. The respective size distributions of the known coating formulations here are deposited, together with their respectively associated coating formulations, in a databank.

The comparing in this case may also encompass comparisons with respective values of mandated size distribution features of individual known toners/pigments which are likewise deposited in a databank. In combination, the toners or pigments identified accordingly in the databank are able to show the calculated size distribution of the target coating. "Size distribution" in the context of the present disclosure embraces the distribution of certain values of one or more different size features within the coating in a respective image. It is conceivable for a size distribution to be determined in each case for every size feature of a plurality of size features—i.e., for example, a size distribution for the diameter of the individual sparkle points, for the area of the individual sparkle points, for the number of pixels of the individual sparkle points within a respective image.

The present invention further relates to an apparatus comprising: a databank, a processor which is in communicative connection to the databank and is configured to communicate with the databank, where the processor is programmed to execute the following steps:
  obtaining or receiving at least one image or a plurality of images, the at least one image having been recorded at a determined measuring geometry, or each image of the plurality of images having been recorded under a different measuring geometry, in particular under a different angle of illumination and/or under a different angle of measurement/consideration, in relation to a surface of a target coating, using an image capture unit,
  implementing an image analysis for each of the images obtained, with use of at least one filter technique,
  identifying at least one sparkle or scintillation point within a respective image,
  implementing a features analysis of the at least one identified sparkle point in the respective image in respect of at least one predefined size feature,
  determining a measure/value for the at least one predefined size feature for the at least one sparkle point,
  calculating a size distribution within the respective image, based on the determined measure/value for the at least one predefined size feature,
  providing a formulation for a coating which is identical or at least similar in appearance to the target coating, taking account of the calculated size distribution.

In one embodiment of the apparatus of the invention, the processor is designed to derive a correlation for at least one toner with the determined measure/value for the at least one predefined size feature of the at least one sparkle point, the correlation indicating a contribution of the at least one toner to the size distribution of the at least one sparkle point, more particularly of two or more identified sparkle points, in the respective image.

In yet another embodiment of the apparatus of the invention, the processor is designed to use the derived correlation, in the case of the measuring geometry under which the respective image was recorded, in order to adapt the at least one toner to the calculated size distribution when providing the formulation for the coating which is identical or at least similar in appearance to the target coating, or to adapt a quantity of the toner, to be specified when providing the formulation, to the calculated size distribution.

In yet another embodiment of the apparatus of the invention, the provision of the coating formulation comprises the generating of a list of toners together with respective quantity and/or concentration figures.

In yet another embodiment of the apparatus of the invention, the provision of the coating formulation comprises the comparing of the size distribution with a respective size distribution of a multiplicity of known coating formulations. Here, the respective size distributions of the known coating formulations are deposited in the databank.

In yet another embodiment, the apparatus further comprises the image capture unit. It is conceivable, further, for the apparatus to comprise one or more light sources and also the target coating, which is applied on a carrier and which together with the carrier forms a subject for measurement, so that the measuring geometry or a plurality of measuring geometries can be realized by the image capture unit for recording the at least one image and/or the plurality of images. The apparatus, accordingly, may comprise the entire measuring arrangement for recording the at least one image and/or the plurality of images. Furthermore, it is conceivable for the apparatus to comprise a spectrophotometer, in order, where appropriate, to record and/or measure further parameters of the target coating, such as, for example, color difference dE, coarseness difference dG and/or sparkle difference dS, which are useful or necessary in order to allow determination of the coating which is identical or at least similar to the target coating, or the formulation of said coating.

The presented invention further relates to a nonvolatile, computer-readable medium which comprises a computer program with program code means which are designed to execute the following steps when the computer program is running on an arithmetic unit, more particularly on the processor of the apparatus describe above:
  obtaining or receiving at least one image or a plurality of images, the at least one image having been recorded at a determined measuring geometry, or each image of the plurality of images having been recorded under a different measuring geometry, in particular under a different angle of illumination and/or under a different angle of measurement/consideration, in relation to a surface of a target coating, using an image capture unit,
  implementing an image analysis for each of the images obtained, with use of at least one filter technique,
  identifying at least one sparkle or scintillation point within a respective image,
  implementing a features analysis of the at least one identified sparkle point in the respective image in respect of at least one predefined size feature,
  determining a measure/value for the at least one predefined size feature for the at least one sparkle point,
  calculating a size distribution for the respective image, based on the determined measure for the at least one predefined size feature,
  providing a formulation for a coating which is identical or at least similar in appearance to the target coating, taking account of the calculated size distribution.

The invention is represented schematically in the drawing, with reference to one embodiment, and is described further with reference to the drawing.

Figure 1:
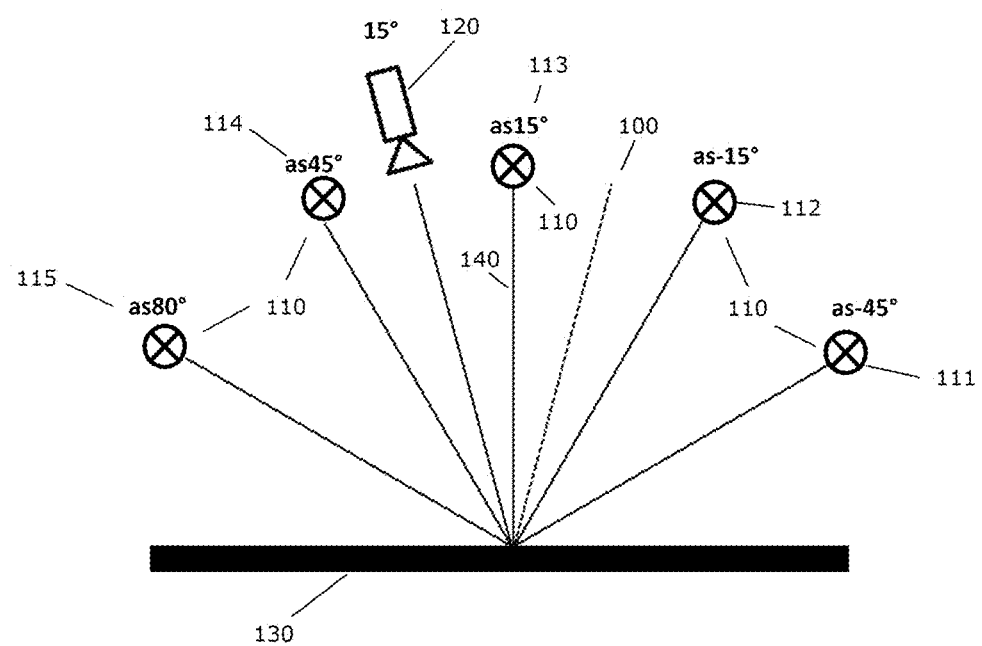
FIG. 1 shows possible measuring geometries for capturing respective images of a target coating in the preliminary stages for implementing one possible embodiment of the process of the invention.

The process of the invention, the apparatus of the invention, and the computer-readable medium of the invention can be applied not only to automotive refinish paints for automobiles and/or automobile bodies and/or ancillary bodywork components but also to other kinds of coatings, including colorants and industrial coatings. The embodiments of the invention that are described below are not intended to impose any limitation.

Embodiments of the process of the invention can be employed in a multiplicity of fields, such as, for example, for comparing and/or coordinating design products and/or cosmetic products and/or fashion products.

Embodiments of the process of the invention can be executed with or implemented in a computer system, which may be a self-standing unit or may comprise one or more external terminals or devices which communicate with a central computer via a network, such as, for example, the Internet or an intranet.

The computer or processor described in the present disclosure, and components coupled thereto and/or integrated therein, may therefore be part of a local computer system or of a remote computer or of an online system or combinations thereof.

The databank described in the context of the present disclosure, and the computer program described here, may be stored or retrievably deposited in an internal computer memory or in a nonvolatile, computer-readable medium.

Embodiments of the process of the invention and/or of the apparatus of the invention use an image capture unit, which may for example be a monochrome or multi-angle color camera, optionally a multi-angle monochrome or multi-angle color camera, optionally in combination with a spectrophotometer, hence allowing an improvement in analysis of a recorded image of a target coating for the purpose of determining texture and other parameters or pigment characterization as part of a color formula algorithm.

The process of the invention and the apparatus of the invention allow the determination of a formulation for coating or pigmenting that is identical or at least similar in appearance to a target coating, thus having an acceptable difference ("offset") relative to the target coating; the process of the invention and the apparatus of the invention reduce a number of databank hits when comparing with a sample coated with the target coating, i.e., with a subject for measurement in a laboratory or field application, and so they permit efficient determination of a matching formulation.

Furthermore, the process of the invention and the apparatus of the invention allow an improved search in a databank and hence the finding of a coating which is deposited in the databank and which coincides better with the target coating; this opens up the possibility of adapting available components for the formulation to be generated to the coating that coincides better with the target coating, and so a user is supplied with a coating that is the best-possible match with the target coating, and time and costs are reduced.

The process of the invention and the apparatus of the invention provide a possibility for rapid identification of special-effect pigments and rapid determination of their respective proportions in the formulation to be provided, this going hand in hand with rapid and effective color adaptation to the target coating.

Possible measuring arrangements take account of angles of incident light and/or angles of illumination, and also angles of viewing and/or angles of measurement, as shown in FIG. 1. In one embodiment of the process of the invention, conventional light sources 110, which use diffuse or collimated (directed) light, and an image capture unit 120, as for example a monochrome or color camera with suitable resolution, can be used in order to record images at one, some or all of the possible angles of illumination that are shown in FIG. 1.

A "measuring arrangement" in the present disclosure means the entirety of those components of a measuring device that serve to illuminate a measuring spot on a surface of a subject for measurement, and to capture the light radiated back from this measuring spot, in order to convert it into corresponding electrical signals, more particularly into a corresponding image. A "normal" is an (imaginary) line, firmly associated with the device, which in the practical use of the measuring device stands ideally perpendicular on the surface of the subject for measurement, and defines the center point of the measuring spot. The "direction of illumination" is the direction in which the measuring spot is illuminated. Similarly, the "direction of observation" means the direction from which the light radiated back from the measuring spot is recorded. The "specular" direction is the nominal direction of observation reflected on the surface of the planar subject for measurement. The measuring plane means a plane which extends through the device normal and all directions of illumination and the direction of observation and also the specular direction. All angular data is based on directions lying within the measuring plane.

In the measuring arrangement shown in FIG. 1, a camera 120 is provided for recording at least one image of a surface of the target coating 130. The camera 120 is arranged at an angle of 15° here relative to the normal 140 to, or the surface of, the target coating 130. At the angle 100 identified here by "gloss", which is arranged likewise at 15° relative to the normal 140 and at 30° relative to the camera 120, there is what is called a "gloss trap" arranged, in order to suppress reflections at a housing of the measuring arrangement. Additionally shown are a plurality of, in the present case five, illuminating installations or light sources 110, which are each arranged at a different angle relative to the specular angle 100, i.e., aspecularly (abbreviation: as) and accordingly are also identified relative to the specular angle 100. Hence the illumination or direction of illumination 111 is arranged at minus 45° (as −45°) relative to the specular angle, the illumination unit or illumination installation 112 at an angle of minus 15° (as −15°), the illumination installation 113 at an angle of 15° (as 15°), the illumination installation 114 at an angle of 45° (as 45°), and the illumination installation 115 at an angle of 80° (as 80°).

The camera 120 then records the surface of the target coating 130 which is illuminated respectively by a light source 111 to 115 under a different illumination angle in each case. By variation in the angle of illumination it becomes possible to identify effect pigments on the basis of their different orientation relative to the surface of the target coating 130. Depending on the orientation of the effect pigments or the platelets or flakes in which the effect pigments are present in finely divided form in the target coating, light is reflected at the measuring angle at which the camera is arranged only when a respective platelet is oriented specularly with respect to the incident light, i.e., when a respective surface normal of a respective platelet is oriented as a mirror axis between the incident light from one of the illumination installations 111 to 115 and the camera. Accordingly, effect pigments each with different orientations can be identified by the camera 120 in an image, using the different illumination installations 111 to 115.

According to embodiments of the process of the invention, a respective distribution, more particularly a respective size distribution, of colored sparkle points or gloss points within a coating (target coating) can be determined at a multiplicity of angles. Generally speaking, for each measuring geometry used, defined for example by an angle of illumination and/or an angle of measurement and/or an illuminant, a size distribution with respect to a predefined size feature is determined, more particularly calculated, for the sparkle points identified within a recorded image. Since effect pigments such as aluminum pigments, micas and Xirallics® are used with different values of respective size features, including shapes, a suitable effect pigment, i.e., an effect pigment matching the particular size distribution calculated, can be selected for a search algorithm, and a relative proportion of a respective effect pigment in the formulation to be provided, needed in order to match the target coating in the best way possible, can be estimated.

In a further embodiment, a frequency analysis can be applied to a respective image. The analysis in question may be a Fourier transformation or the application of a high-pass filter. A high-pass filter can be applied to the respective image, recorded from the target coating under a defined measuring geometry, in order to recognize and determine the sparkle points in the respective image. The resultant data or images in that case contain only information concerning the sparkle points. In order to refine the sparkle points further or filter them out, it is possible to apply an edge recognition method for the filtering in conjunction with a light-intensity filtering procedure. High-pass filters are, for example, the Sobel Operator or the Laplace Operator. High-pass filters find regions in a respective image with a high gradient and/or with strong local changes in intensity, such as, for example, sparkle points through local changes in the light intensity. They are commonly used in order to reinforce fine structures in the image, that can subsequently be separated with segmentation algorithms and subsequently processed further.

Furthermore, in accordance with the invention, individual sparkle points can be tagged, assigned to respective classes on the basis of their respective size measures, such as lengths of the diameter, area and/or length of the perimeter, and counted, whereby they are isolated/marked on the basis of the size range/interval to which they are assigned. It is possible to compile a histogram of the sparkle points identified in a particular image. For more effective illustration, only a small selection of sparkle points has been identified in FIG. 3c by a respective size, defined by one or more size measures of, correspondingly, one or more size features. It is apparent, however, that there are a plurality of sparkle points present, with respective sizes that can be assigned to them in each case, it being possible that these sizes could be labeled. A regional/local marking may include a numerator for each image segment and/or each respective size measure of a predefined size feature. The marking methods to be employed here may comprise a moving from pixel to pixel from left to right, from top to bottom of a respective image, the finding of as yet untagged pixels in a respective image, which coincide with a defined quality, and a marking of pixels in a respective image which, after a defined number of movements, starting from a first tagged pixel, fulfil the same criteria as said first pixel. A second run of the regional marking may be used in order to connect regions adjoining one another that fulfil the same criteria.

A second regional marking of this kind may be performed by a plurality of runs/filters, one each for size measures or size ranges assigned to respective materials/pigments, or as a stage with examination for specific size range values.

The process of the invention may lead to a counting of tagged sparkle points, with each tagged sparkle point fulfilling at least one predefined criterion in relation to a size measure of at least one size feature. Thus, for example, all sparkle points which have a certain mandated diameter, a certain mandated perimeter and/or a certain mandated area, or whose diameter, area and/or perimeter lie or lies in each case within a certain mandated values interval, are counted, with the certain mandated diameter, the certain mandated perimeter and/or certain mandated area and/or the certain mandated respective values intervals being assignable or assigned to a specific pigment or pigment type or to a specific material.

The use of a series of band-pass filters on a size range basis is conceivable, with individual size ranges being identified independently of position, hue, and lightness of the respective sparkle points.

Sparkle points that are similar in respect of a selected size feature are averaged on the basis of the selected size feature, such as, for example, a diameter, an area, a perimeter. In this way, effectively, a size distribution in relation to the selected size feature is provided for the measured range. A size distribution of this kind can be used, for example, in order to determine a relative amount of a given toner, which is assigned to a certain values range of the selected size feature, within the complex coating, i.e., target coating. The value of the selected size feature may, moreover, be compared with a databank for values of the selected size feature that are assigned each to specific pigments/toners or mixtures of pigments/toners. The comparison can be used in order to select the most similar toners available within a given paint system to be used for effect coating adaptation and/or for adaptation to the target coating. The pool of toners for selection and the relative amount of each toner can also be used in order to be fed to a formulating and/or searching machine.

It will be appreciated that the embodiments of the invention can be used in connection with other parameters, such as, for example, intensity of the sparkle points, sparkle color, lightness of the sparkle points, and also reflection data and/or color data.

In order to be able to identify a type of toner used in an unknown coating, i.e., in the target coating to be reproduced, as precisely and accurately as possible, so as to be able to reproduce the target coating as precisely as possible, it is desirable to consider specific predefined measuring geometries and to compare the resulting measurement data with existing known toners and with the values thereof, known for the corresponding measuring geometries, in a databank compiled beforehand. It is also possible to carry out deliberate production of toner mixtures in order to evaluate the influence of different concentrations of the toners on a size feature, such as, for example, on the diameter, the area and/or the perimeter, of a sparkle point.

It is also conceivable to perform a statistical analysis of the determined size measures and/or size values of the predefined size features for each of the individual sparkle points identified within an image, and then to determine and evaluate the influence of the respective toners and/or their respective concentrations in mixtures of two or more toners on this statistical analysis. Results of the statistical analysis of the determined size measures and/or size values of the predefined size features for the individual sparkle points may be, for example, the following:

average area of the surfaces of the identified sparkle points,
average diameter (of the surfaces) of the identified sparkle points,
median of the areas of the surfaces of the identified sparkle points, median of the diameters (of the surfaces) of the identified sparkle points, quartiles of the areas of the surfaces of the identified sparkle points, quartiles of the diameters (of the surfaces) of the identified sparkle points, standard deviation of the areas of the surfaces of the identified sparkle points, standard deviation of the diameters (of the surfaces) of the identified sparkle points.

The median, also called central value, is an average value and positional parameter. The median of the measurement values in an original list is the particular measurement value which is exactly "in the middle" when the measurement values are sorted by size. In general, a median divides a data set, a random sample or a distribution into two halves (of equal size) in such a way that the values in one half are not greater than the median value, and in the other half are not less.

Quartiles are values which divide a random sample of data into four equal parts. Using these quartiles, it is possible rapidly to determine scatter and central tendency of a data set.

The statistical analysis or descriptive statistics allow a selection to be made of parameters and/or of values of, for example, the size features stated above, in order to determine a measure of similarity between a target coating and a hue reproduction, and permit simplified consideration of all the sparkle points, i.e., of the entirety of the sparkle points within a particular image of the target coating and/or of the hue reproduction. The entirety of the sparkle points or of a respective subgroup of sparkle points within a respective image can be assigned, as a result of statistical analysis, a particular value, i.e., an average area of the sparkle points of the entirety or of the respective subgroup, an average diameter of the sparkle points of the entirety or of the respective subgroup, and so on. On the basis of the respective values for the entirety or for the respective subgroup, the respective sparkle points can be classified. The values obtained can be compared with corresponding values deposited in a databank for different types of toners and/or effect pigments—for example, of aluminum flakes of different size and/or shape, or pearls of different size.

This comparison at least furnishes additional information for finding an optimum formulation for reproducing the unknown target coating.

Each individual (statistically) determined value of a predefined size feature of the sparkle points can be compared, in the case of a particular measuring geometry, with the databank of the known toners which have been measured at the same or similar measuring geometry before or for the purpose of the compilation of the databank. Thus, for example, all toners having a certain known diameter of the sparkle points generated by them in each case (in solution and/or within a coating) can be compared, at a given measuring geometry, with the unknown coating (the target coating). The respective size feature of the respective toners or of mixtures of the toners, over the range of the selected measuring geometries, can be evaluated by respective comparison with the target coating.

The sparkle points caused by one or different toner(s) may differ in a respective size feature, such as diameter and/or area. Through the consideration of calculated size distributions it is possible to identify combinations/mixtures of toners, such as of different types of aluminum toners, for example, when they clearly and unambiguously differ from one another in particular size features. It is also possible in this way, where appropriate, to determine or at least estimate a quantitative ratio of toners within a mixture.

Figure 2:
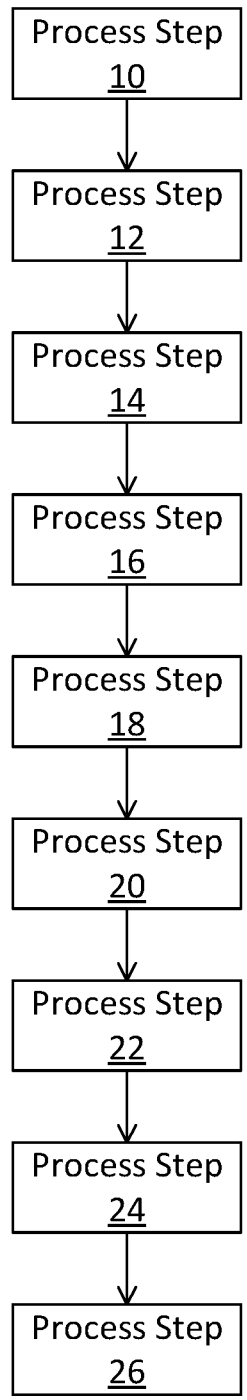
FIG. 2 shows in schematic representation a sequence of one embodiment of the process of the invention.

FIG. 2 illustrates one embodiment of the process of the invention used ultimately to determine a formulation for a coating which is identical or at least similar in appearance to a target coating. After measurement 10 of the target coating with a measuring device, such as a spectrophotometer, in particular a spectrophotometer with monochromatic or color camera, for at least one predetermined measuring geometry, more particularly one of the measuring geometries as shown for example in FIG. 1, an image analysis 12 is carried out for each recorded image for the at least one measuring geometry. With the aid of the image analysis, it is possible to determine the sparkle points in each image recorded for the at least one measuring geometry, in a step 14. In the course of the image analysis, in general, in a first step, an image segmentation followed by a process known as "blob detection" is carried out. In the operation of machine vision, image segmentation is customarily the first step in image analysis, and comes after preliminary processing of the image.

Figure 3A:
FIG. 3 shows in FIG. 3a an image, recorded by a camera, of a target coating under a defined measuring geometry.
in FIG. 3b, an image filtered as part of an image segmentation procedure, starting from the image from FIG. 3a; and, in FIG. 3c, sparkle points detected in the image from FIG. 3b.
Figure 3B:
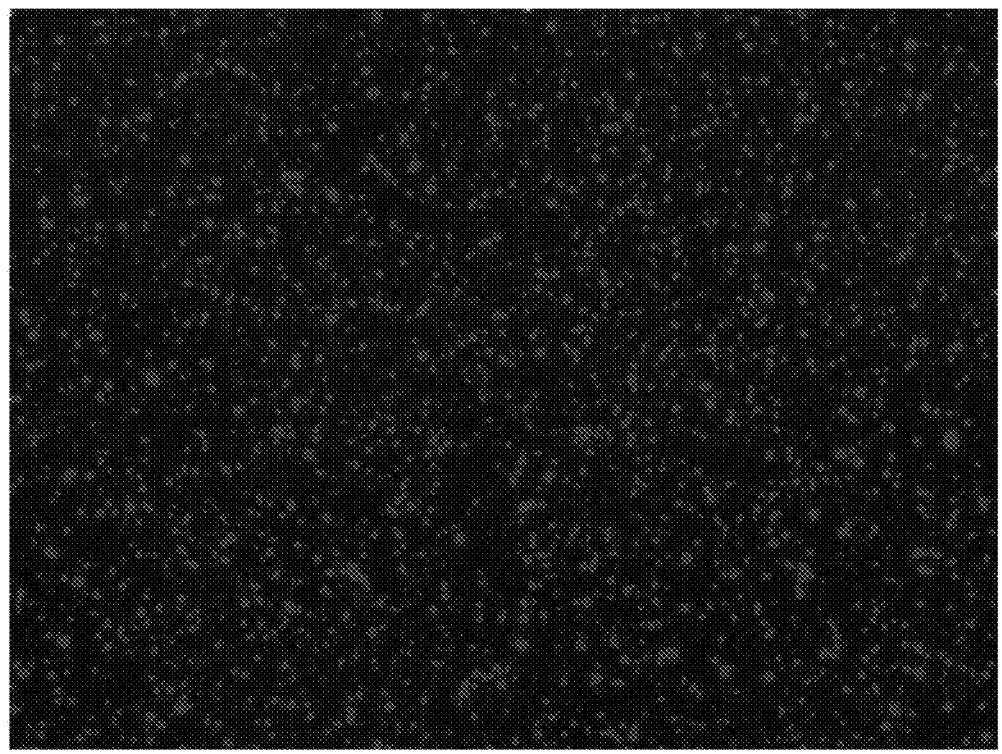

In the preliminary processing of the image, the first step is that of analyzing the intensity values of the images to be investigated and, where appropriate, adapting them in order better to express the imaged structures of the respective images. Accordingly, by partial elimination of areas that are too light and too dark, it is possible to compensate disruption factors resulting, for example, from inconsistent light conditions. After that, the processed images are converted into binary images by means of a threshold value process. The binary image obtained therefore represents a filter mask of the color value employed in the threshold value process. In FIG. 3b, the color value chosen is "red", for example, and the foreground of the original multicolor image shown in FIG. 3a (recognizable in the black-and-white image by shading of differing lightness) is masked by the applied filtering with "red" (perceptible as a uniform light gray in the black-and-white image). This means that all of the sparkle points present in the original image (FIG. 3a) now appear red (in the black-and-white image, light gray) in the image shown in FIG. 3b, as a result of the filter mask.

In the course of the subsequent image segmentation, the binary image (FIG. 3b) is segmented on the basis of contiguous areas, and these segments are handed over for blob detection.

Blob detection or the blob detection process is aimed at recognizing regions within a digital image which differ from the surrounding regions in qualities such as lightness/light intensity or color. Informally, a blob or spot is a sector of an image within which certain qualities are constant or approximately constant.

Figure 3C:
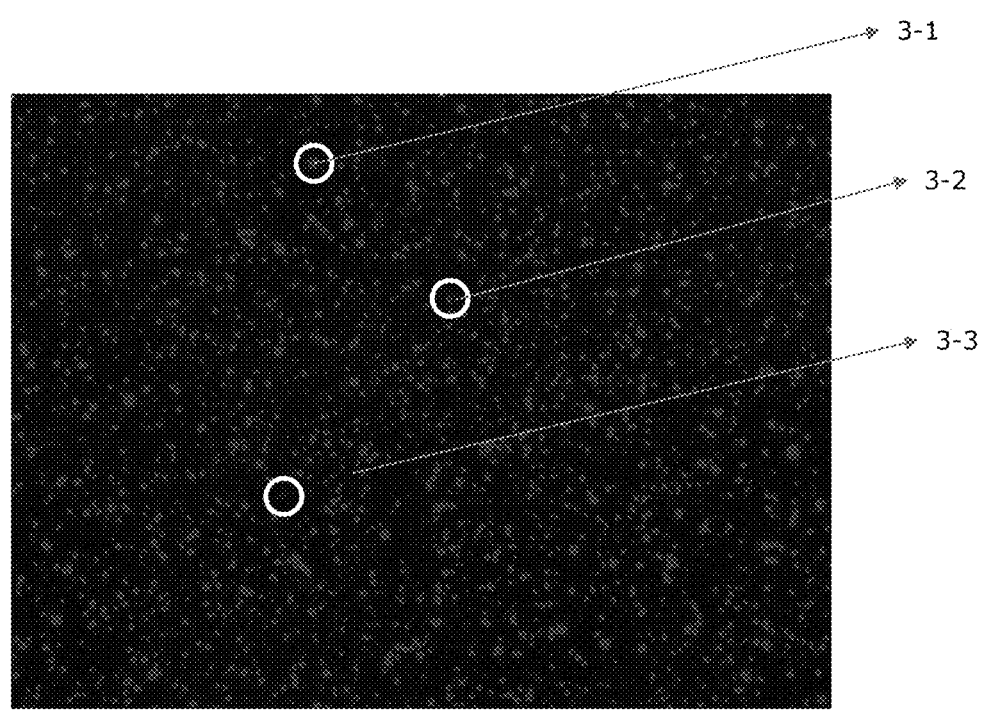

With the aid of the blob detection process, individual sparkle points, 3-1 to 3-n, where n is an integer, can be recognized/identified on the basis, for example, of their respective light intensity. For each individual sparkle point, a value or a measure for at least one size feature can then be determined in a step 16. In FIG. 3c, by way of example, three sparkle points 3-1, 3-2, and 3-3 are identified by respective encirclement. For each of the sparkle points 3-1, 3-2 and 3-3, the area or a value of the area of a surface of the respective sparkle point and a diameter or a value of the diameter of the surface of the respective sparkle point have been determined. Sparkle point 3-1 has an area of the surface of 30 micrometers and a diameter of the surface of 6 micrometers; sparkle point 3-2 has an area of the surface of 10 micrometers and a diameter of the surface of 3 micrometers; sparkle point 3-3 has an area of the surface of 2 micrometers and a diameter of the surface of 1 micrometer.

The determined values of the respective size features of all the sparkle points are then subjected to a statistical process—that is, they are evaluated statistically. Here, first of all, sparkle points having values of similar magnitude for the size features considered can be grouped together, enabling a kind of classification of the sparkle points. For each group of the sparkle points thus grouped, it is then possible, in a further step, to determine in each case the following size features for each group:

- average area of the surfaces of the identified sparkle points,
- average diameter (of the surfaces) of the identified sparkle points,
- median of the areas of the surfaces of the identified sparkle points,
- median of the diameters (of the surfaces) of the identified sparkle points,
- quartiles of the areas of the surfaces of the identified sparkle points,
- quartiles of the diameters (of the surfaces) of the identified sparkle points,
- standard deviation of the areas of the surfaces of the identified sparkle points,
- standard deviation of the diameters (of the surfaces) of the identified sparkle points.

This produces a size distribution 18 of the sparkle points.

Accordingly, for each predefined measuring geometry under which at least one image in each case is recorded and is evaluated as described above, a measuring geometry-specific size distribution 18 of the sparkle points is obtained in respect of a predefined size feature.

The resultant values of the mandated size features can be correlated or compared in a step 20 with values deposited in a databank for the mandated size features of known toners which have been measured in respect of these size features as a preliminary stage, at a measuring geometry which is the same in each case or at least comparable. The databank here may contain deposited corresponding values both for individual toners, such as aluminum flakes of different size or pearls of different size, and for known mixtures/formulations of different toners that have already undergone measurement.

The formulation found in the databank in a step 22 for a coating which exhibits the greatest coincidence with the target coating is then displayed as the best matching formulation.

In a further embodiment, it is conceivable for the importance of an angle of illumination and/or angle of viewing or measurement angle, or of a group of angles of illumination and/or measuring angles, each to be weighted with a weighting factor.

As soon as a best match has been found in the databank in a step 24, the coating can be produced with consideration of the coincidence found. Here, for example, a base coating can be adjusted by addition of toners identified in the target coating and/or encompassed by the best match, or a formulation can be generated exclusively on the basis of the toners identified. It is usual in this case to take account of other parameters as well, such as color difference dE, coarseness difference dG and/or sparkle difference dS, etc. If the formulation is generated exclusively on the basis of the toners identified, it may be useful to compare the respective toners identified in the target coating with toners deposited in a toner databank, and ultimately to determine the proportion/concentration thereof in relation to their interaction in the coating that is to be generated.

The ratios of the toners should be set such that they coincide most precisely with the values actually measured for the at least one size feature of the sparkle points, i.e., with the calculated size distribution in the case of the particular predetermined measuring geometry. For each toner in the databank, it is possible to derive a correlation (e.g., linear, polynomial, static model, such as neural network, for example, etc.) which indicates the contribution of the toner in question to the size distribution of the sparkle points, based on the concentration of the respective toner. The respective correlation can then be used to adapt the amount of the individual toners in such a way that it best corresponds to the size distribution of the sparkle points for the particular image recorded of the target coating.

The formulation ultimately obtained in this way for the coating that is the best fit with the target coating is output to a user in a step 26, on a display, for example, and/or by means of another suitable output unit, such as an acoustic output unit, such as a loudspeaker, for example.

To simplify the process, it is conceivable to carry out a first approximation to the unknown target coating through identification of effect pigment toners, such as "mica", "aluminum", or "Xirallic®". When the type of toner has been identified, the individual toners present in the target coating can be characterized more specifically and compared with a databank for selection from a plurality of toners.

Figure 4:
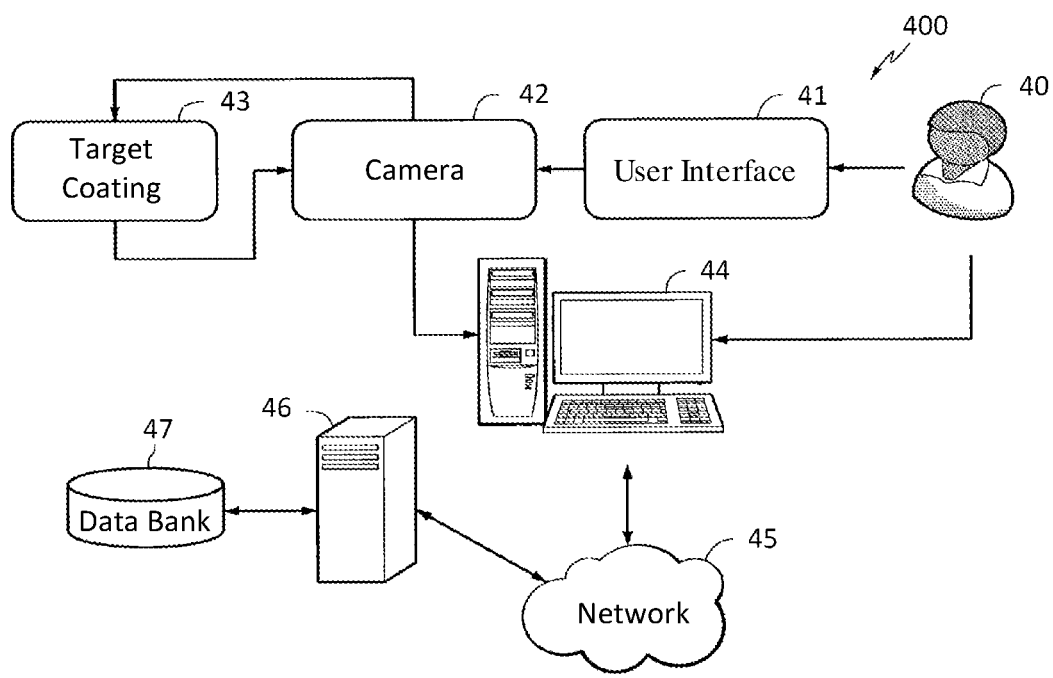
FIG. 4 shows, in schematic representation, one embodiment of an apparatus of the invention.

FIG. 4 shows an embodiment of an apparatus 400 of the invention which can be used in order to implement an embodiment of the process of the invention. A user 40 is able to use a user interface 41, such as a graphic user interface, for example, in order to control a spectrophotometer and/or a camera 42, in order to determine/measure the qualities of a target coating 43. The measurement data from the spectrophotometer and/or the camera 42 are transmitted to a computer or a processor 44. The computer 44 may be a personal computer, a mobile device or an arbitrary processor. The computer 44 is able to communicate via a network 45 with a server 46. The network 45 may be any desired kind of network—for example, the Internet, a local network, an intranet, or a wireless network. The server 46 is connected to a databank 47, which is able to store the data and information used for purposes of comparison by the process of the invention. The databank 47 may be used and/or located, for example, in a client server environment or in a Web-based environment, such as a cloud computing environment.

Various steps of the process of the invention can be executed by the computer 44 and/or by the server 46.

In a further embodiment, the invention may be implemented as a nonvolatile, computer-readable medium which comprises a computer program code, to cause a computer or computer system to execute the process of the invention when the computer program is running on the computer or computer system. The computer program may comprise various modules, which serve for a computer or a user interface to implement the above-described process.

LIST OF REFERENCE NUMERALS

3-1 Sparkle point
3-2 Sparkle point
3-3 Sparkle point
10 Process step
12 Process step
14 Process step 16 Process step
18 Process step
20 Process step
22 Process step
24 Process step
26 Process step
40 User
41 User interface
42 Camera
43 Target coating
44 Processor, computer
45 Network
46 Server
47 Databank
100 Specular angle
110 Light sources
111 Light source
112 Light source
113 Light source
114 Light source
115 Light source
120 Image capture unit, camera
130 Target coating
140 Normal to the surface of the target coating
400 Apparatus

What is claimed is:

1. A computer-implemented process using a computer system including at least one processor in communication with a network, the method comprising:
receiving, from a spectrophotometer and/or a camera, at least one image or a plurality of images, the at least one image having been recorded at a determined measuring geometry, or each image of the plurality of images having been recorded under a different measuring geometry, in relation to a surface of a target coating, using an image capture unit associated with the spectrophotometer and/or the camera;
analyzing, by the at least one processor, each of the at least one image or the plurality of images;
executing, by the at least one processor, at least one filter technique, on the at least one image or the plurality of images by performing a frequency analysis using a high-pass filter and/or an edge recognition method in conjunction with light intensity filtering;
identifying at least one sparkle point within a respective image based on the execution;
analyzing, by the at least one processor using a features analysis, the at least one identified sparkle point within the respective image in respect of at least one predefined size feature;
determining at least one value for the at least one predefined size feature for the at least one identified sparkle point;
assigning the at least one identified sparkle point to a class of a plurality of classes based on the at least one determined value, each of the plurality of classes compiling one or more sparkle points based on a size measure range of each of the one or more sparkle points;
calculating, by the at least one processor, a size distribution for the respective image based on the assignation;
deriving, by the at least one processor, a correlation for at least one toner with the at least one determined value for the at least one predefined size feature of the at least one identified sparkle point, the correlation indicating a contribution of the at least one toner to the calculated size distribution of the at least one identified sparkle point in the respective image;
measuring, by the at least one processor using the derived correlation, the geometry under which the respective image was recorded in order to adapt the at least one toner to the calculated size distribution in a context of a provision of a formulation as an additional optimization parameter; and
providing, by the at least one processor, the formulation for a coating which is identical or at least similar in appearance to the target coating taking account the calculated size distribution, wherein providing the formulation for the coating comprises providing a list of toners together with quantity and/or concentration data.

2. The process according to claim 1, wherein the at least one predefined size feature is selected from a group consisting of an area of a surface of the at least one identified sparkle point or of a respective sparkle point, a diameter of the at least one identified sparkle point or of the respective sparkle point, and a perimeter of the at least one identified sparkle point or of the respective sparkle point.

3. The process according to claim 1, wherein the at least one determined value is stated in a number of pixels, in a length unit and/or in an area unit.

4. The process according to claim 1, wherein providing the formulation for the coating further comprises a comparison of the calculated size distribution with a respective size distribution of a multiplicity of known coating formulations.

5. An apparatus at least comprising:
a databank, and
a processor in communicative connection with the databank and configured to communicate with the databank, wherein the processor is programmed to execute the following steps:
receiving, from a spectrophotometer and/or a camera, at least one image or a plurality of images, the at least one image having been recorded at a determined measuring geometry, or each image of the plurality of images having been recorded under a different measuring geometry, in relation to a surface of a target coating, using an image capture unit associated with the spectrophotometer and/or the camera;
analyzing each of the at least one image or the plurality of images;
executing at least one filter technique on the at least one image or the plurality of images by performing a frequency analysis using a high-pass filter and/or an edge recognition method in conjunction with light intensity filtering;
identifying at least one sparkle point within a respective image based on the execution;
analyzing, using a features analysis, the at least one identified sparkle point within the respective image in respect of at least one predefined size feature;
determining at least one value for the at least one predefined size feature for the at least one identified sparkle point;
assigning the at least one identified sparkle point to a class of a plurality of classes based on the at least one determined value, each of the plurality of classes compiling one or more sparkle points based on a size measure range of each of the one or more sparkle points;
calculating a size distribution for the respective image based on the assignation;
deriving a correlation for at least one toner with the at least one determined value for the at least one predefined size feature of the at least one identified sparkle point, the correlation indicating a contribution of the at least one toner to the size distribution of the at least one identified sparkle point in the respective image;

measuring, using the derived correlation, the geometry under which the respective image was recorded in order to adapt the at least one toner to the calculated size distribution in a context of a provision of a formulation as an additional optimization parameter; and providing, taking account the calculated size distribution, the formulation for a coating which is identical or at least similar in appearance to the target coating, wherein providing the formulation for the coating comprises providing a list of toners together with quantity and/or concentration data.

6. The apparatus according to claim 5, wherein providing the formulation for the coating comprises a comparison of the calculated size distribution with a respective size distribution of a multiplicity of known coating formulations, respective size distributions of the known coating formulations being deposited in the databank (47).

7. The apparatus according to claim 5, further comprising the image capture unit and/or an output unit for outputting the formulation for the coating.

8. A non-transitory, computer-readable medium which comprises a computer program with program code means which are designed to execute the following steps when the computer program is running on the processor of the apparatus according to claim 5:

receiving, from a spectrophotometer and/or a camera, at least one image or a plurality of images, the at least one image having been recorded at a determined measuring geometry, or each image of the plurality of images having been recorded under a different measuring geometry, in relation to a surface of a target coating, using an image capture unit associated with the spectrophotometer and/or the camera;

analyzing each of at least one image or the plurality of images;

executing at least one filter technique on the at least one image or the plurality of images by performing a frequency analysis using a high-pass filter and/or an edge recognition method in conjunction with light intensity filtering;

identifying at least one sparkle point within a respective image based on the execution;

analyzing, using a features analysis, the at least one identified sparkle point within the respective image in respect of at least one predefined size feature;

determining a measure for the at least one predefined size feature for the at least one identified sparkle point;

assigning the at least one identified sparkle point to a class of a plurality of classes based on the at least one determined value, each of the plurality of classes compiling one or more sparkle points based on a size measure range of each of the one or more sparkle points;

calculating a size distribution for the respective image based on the assignation;

deriving a correlation for at least one toner with the at least one determined value for the at least one predefined size feature of the at least one identified sparkle point, the correlation indicating a contribution of the at least one toner to the calculated size distribution of the at least one identified sparkle point in the respective image;

measuring, using the derived correlation, the geometry under which the respective image was recorded in order to adapt the at least one toner to the calculated size distribution in a context of a provision of a formulation as an additional optimization parameter; and providing, taking account of the calculated size distribution, a formulation for a coating which is identical or at least similar in appearance to the target coating, wherein providing the formulation for the coating comprises providing a list of toners together with quantity and/or concentration data.

9. The process according to claim 1, wherein the at least one determined value is stated in in micrometers and/or square micrometers.

10. The process according to claim 1, wherein the correlation indicates an additional contribution of the at least one toner to the calculated size distribution of two or more identified sparkle points in the respective image.

11. The apparatus according to claim 5, wherein the correlation indicates an additional contribution of the at least one toner to the calculated size distribution of two or more identified sparkle points in the respective image.

12. The process according to claim 1, wherein the coating is a paint coating.

* * * * *